United States Patent [19]

Solhjell

[11] Patent Number: 5,162,780
[45] Date of Patent: Nov. 10, 1992

[54] TRACKBALL FOR DATA ENTRY AND CONTROL WITH OPTIMIZED BALL HEIGHT

[75] Inventor: Erik Solhjell, Oslo, Norway

[73] Assignee: Tandberg Data A/S, Oslo, Norway

[21] Appl. No.: 717,938

[22] Filed: Jun. 20, 1991

[51] Int. Cl.$^5$ ............................................. G09G 3/02
[52] U.S. Cl. ................................................. 340/710
[58] Field of Search ............... 340/710; 74/471 XY; 248/118.3

[56] References Cited

U.S. PATENT DOCUMENTS

| | | | |
|---|---|---|---|
| 4,404,865 | 9/1983 | Kim | 74/471 XY |
| 4,538,476 | 9/1985 | Luque | 74/471 XY |
| 4,545,554 | 10/1985 | Latino et al. | 248/118.3 |
| 5,045,842 | 9/1991 | Galvin | 340/710 |

Primary Examiner—Jeffrey A. Brier
Assistant Examiner—A. Au
Attorney, Agent, or Firm—Hill, Van Santen, Steadman & Simpson

[57] ABSTRACT

A trackball system is provided wherein a roller ball is received and supported within a ball retaining assembly. A vertical height of the ball is adjusted relative to the housing by adjusting a vertical height of the ball assembly relative to the housing. By changing vertical height of the ball relative to a top surface of the housing having an aperture through which the ball protrudes, a selectable portion of the ball will protrude through the aperture. Thus, an operator may make height adjustments of the ball relative to the top housing surface to suit his individual preference.

20 Claims, 2 Drawing Sheets

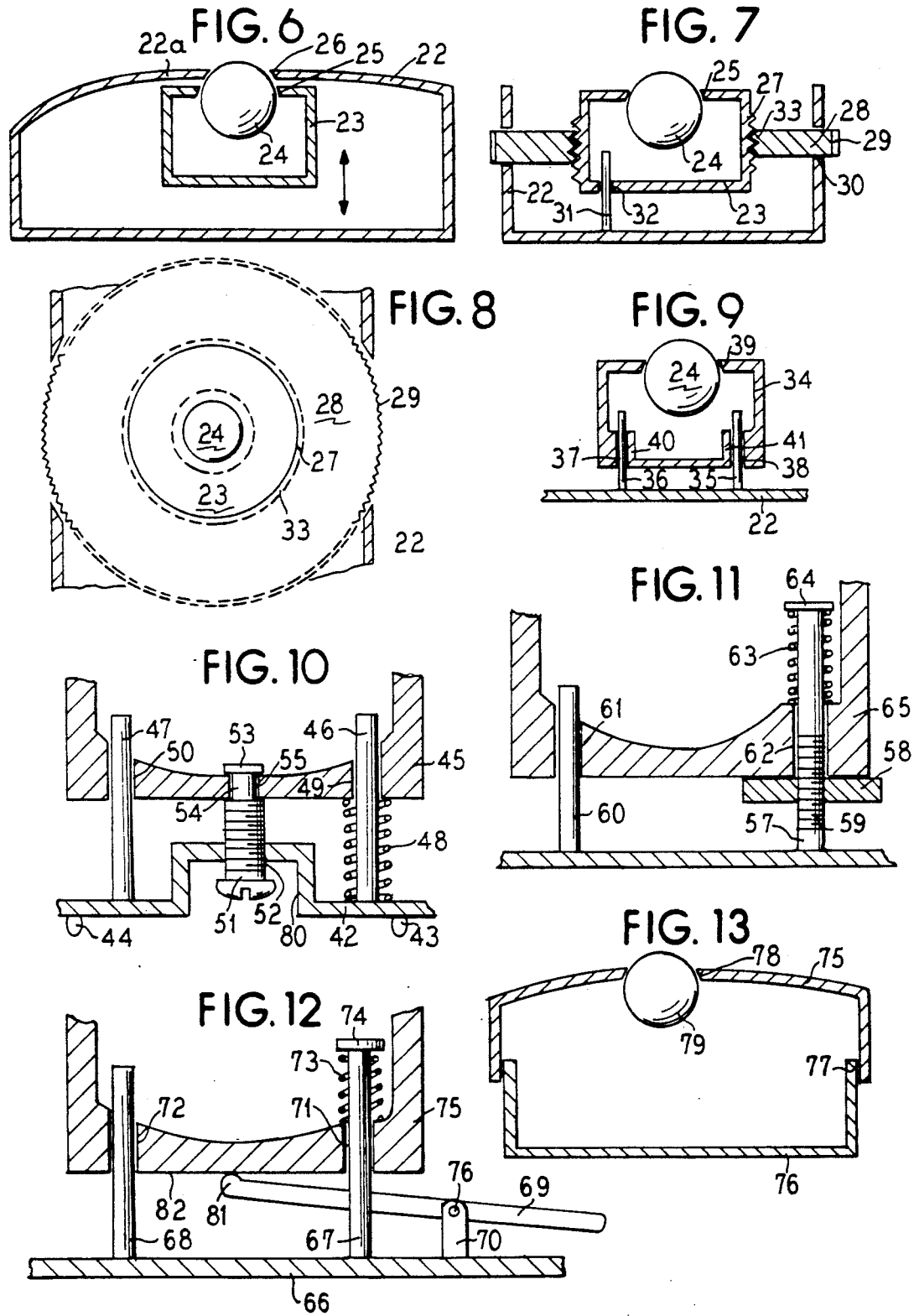

TRACKBALL FOR DATA ENTRY AND CONTROL WITH OPTIMIZED BALL HEIGHT

BACKGROUND OF THE INVENTION

The present invention relates to a trackball used for data entry into a computer system.

A keyboard is normally used to enter data manually into a computer system. These keyboards can be made in many different versions. However, they are all designed around the same basic concept: the keyboard contains groups of "Keys", each assigned to a specific letter or number, or one or more signs. Additionally, most modern keyboards for data systems also contain a series of function keys. Each function key may activate a special operation, depending upon the program being executed in the computer.

To simplify operations, many data systems and computer programs are also designed to work with a "Trackball" in addition to the keyboard. Although these trackballs may take many forms, their basic functions are the same: a unit containing a ball and one or more keys which may be pressed down. Two types of ball systems exist, as described hereafter.

In the first type, the ball is mounted on the bottom side of the trackball housing. Moving the trackball by rolling the trackball housing along a table will make the ball roll. This rolling ball operation is transferred to a corresponding movement of the cursor on the data screen of the connected computer. The ball operating can be translated into a distance and direction moved along an x-axis and a distance and direction moved along a y-axis. This movement is then transferred to the computer which moves the cursor on the screen in directions and distance corresponding to those given by the mouse movement. In most programs the relationship between a given rolling distance of the trackball ball and the corresponding movement of the cursor can be programmed, and also the acceleration of the trackball operation can be programmed.

The second type of trackball design differs, since the ball is on the top of the trackball housing. Again the trackball housing can be moved, but the basic operation is performed by having the trackball rest fairly permanently. The ball is moved by rolling it with the hand. This again will correspond to a movement of the cursor as described above.

Sometimes the term "mouse" is used instead of the term "trackball".

Both trackball designs therefore operate the cursor in the same way, the difference between the designs being related to the movement of the ball. Both versions typically have one or more keys 6, 7 as shown in FIG. 2, or 8, 9 as shown in FIG. 4, which the operator may activate in addition to the operation of the ball. Depending upon the computer program, the operation of the ball together with the pressing of one or more keys will create specified operations or reactions by the computer program.

Although trackball operations may increase an operator's efficiency, the trackball also poses some problems. Trackballs designed to be moved along a table (roller ball on bottom), may require a fairly substantial table area. In some computer areas, this may cause problems. Also, the operator has to move his or her arm away from the keyboard area, which may slow down the overall efficiency and create muscle problems.

The other trackball type with the roller ball on the top does not require a large additional table area for its operation. However, because the operator's hand shall control both the rolling of the ball and the keys directly, the design of the ball and the housing around the ball is very critical. As the human hand varies fairly much, this may cause some problems.

FIGS. 1 and 2 show at 10 a typical trackball design with a ball 11 on the under side of a trackball housing 12. For simplicity, this is referred to as "Type 1" in the following text. FIGS. 3 and 4 show a trackball 13 with a ball 14 on the top side of a housing 15. This will be referred to as "Type 2" in the following text.

When the ball on a trackball of type 2 is rolled by the hand of the operator, the ball movement is transferred to an "x-" and a "y-" control system internally in the trackball housing. Although this control system may vary in design, the basic principle is to register the movement of the ball on an x and y axis. Typically the ball 19 is touching three or four rollers, such as shown in FIG. 5 at 16, 17, and 18, where one or two are free-rolling (such as 18) and the other two (such as 16 and 17) are connected to systems via measuring devices 20 or 21 for detecting the direction of the revolution of the roller and the length of rolling, as shown in FIG. 3. One of these detection rollers is referred to as the x-axis controller 16, the other one (90 degrees off the x-axis roller 16) is referred to as the y-axis controller 17. The free roller is shown at 18 (see FIG. 3). The two rollers 16 and 17 work independently. The direction and movement of the x- and y-controllers are transferred to the cursor on the data screen of the connected data system. Most programs permit the ratio between the movement of the ball in the x-direction and the y-direction, and the corresponding movement of the cursor in the same directions, to be set to suit the specific taste and requirements of the operator.

The type 1 trackball operates in the same way, except that the ball is on the bottom side and the ball is rolling by moving the trackball along the table.

The extra trackball keys such as 6, 7 or 8, 9 which may be pressed down by the operator are used to mark special cursor locations, start and stop of a cursor movement, etc. This will vary depending upon the program being run. Typically, a trackball may have two or three keys in addition to the ball. More than three keys are normally not practical.

SUMMARY OF THE INVENTION

Although a trackball in many applications is an effective tool, it is important that the trackball system is designed ergonomically to ease operator fatigue and increase operator's efficiency. The problem is that it is very difficult to set up exact design rules for design of a trackball so that it fits most operators. The human hand varies fairly much, and what may be good for one operator may not fit another one. Therefore, many different trackball designs exist, each trying to meet as large a possible a group of typical operators.

It is an object of the present invention to provide a trackball having a means for adjusting the trackball ball for optimum height for each operator who uses the trackball.

This invention makes it easier to adapt a trackball of type 2 to the particular need of an operator by making it possible to adjust the height of the ball above the trackball housing. The invention may also be used for a type 1 trackball, but it is expected that the invention may be especially suited for a trackball of type 2.

According to the invention, a trackball system is provided where the vertical height of the ball assembly is adjustable in convenient fashion, such as by an operator of the trackball.

BRIEF DESCRIPTION OF THE DRAWINGS

FIG. 6 is a cross sectional view of a side of a trackball system having a ball which is movable up and down in accordance with the invention;

FIG. 7 is a cross sectional view of a first embodiment of a mechanism for moving the ball up and down in accordance with the invention;

FIG. 8 is a top view of the mechanism of FIG. 7;

FIG. 9 is a side cross sectional view of a second embodiment of a mechanism for moving the ball up and down according to the invention;

FIG. 10 is a partial cross sectional view from the side showing additional mechanisms for use with the ball raising and lowering mechanism of FIG. 9;

FIG. 11 is an alternate embodiment of a mechanism for raising and lowering the mechanism shown in FIG. 9;

FIG. 12 is a further embodiment of a mechanism for raising and lowering the mechanism of FIG. 9; and FIG. 13 is a cross sectional view showing a trackball housing having a snap-on removable cover with an aperture size dimensioned for a close fit to a ball which protrudes therethrough so that depending upon a height of adjustment of the ball, there is a close match between the cover and the ball where the ball protrudes therethrough;

DESCRIPTION OF THE PREFERRED EMBODIMENTS

Figure 1:
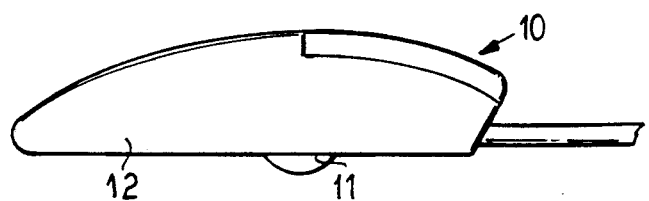
FIG. 1 is a side view of a prior art trackball system of a so-called "type 1" wherein the ball is on the bottom of a housing of the trackball system.
Figure 2:
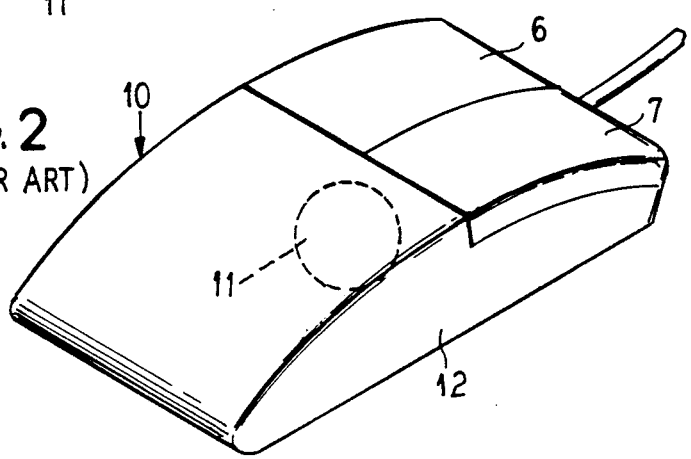
FIG. 2 is a perspective view of the trackball system shown in FIG. 1.
Figure 3:
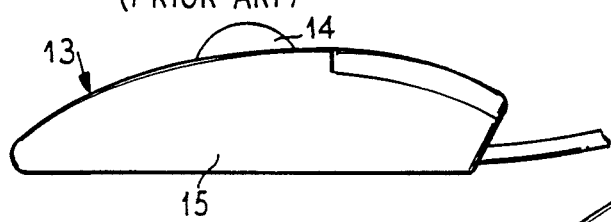
FIG. 3 is a side view of a so-called "type 2" prior art trackball system where the roller ball is on a top of the housing of the trackball system.
Figure 4:
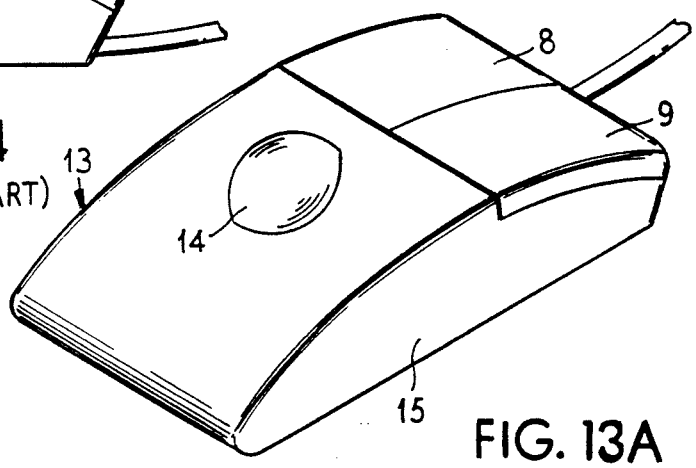
FIG. 4 is a perspective view of the type 2 trackball system shown in FIG. 3.
Figure 5:
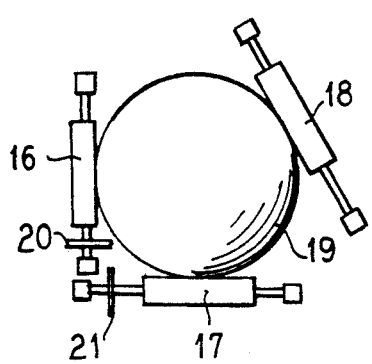
FIG. 5 is a side schematic illustration of internal rollers in contact with the ball of a trackball system according to the prior art.

The principle of the invention is shown in FIG. 6. A type 2 trackball will be used as a basis for the description. A fairly large ball 24 is mounted in a trackball housing 22 by use of a ball assembly 23 supporting the ball 24 at aperture 25 in ways well known in the prior art. For simplicity, the rollers carrying the ball are not shown in the Figures. Instead of being a fixed system, as used in designs today, this new invention is based on the entire ball assembly 23, including rollers, etc., being movable up or down along the vertical axis as shown by the double arrows. This will have the effect of increasing (ball higher up) or decreasing the size of the ball above the top cover or surface 22a of the trackball housing 22. Thus, the portion of the top of the ball 24 which extends through aperture 26 is controllable. Each operator may therefore adjust the ball to fit his or her taste.

This vertical movement of the whole ball assembly 23 may be achieved in many ways. FIGS. 7 and 8 show a system using a circular ring or wheel 28 with outer roughening 29 and with internal threads 33. The ball assembly 23 has a design wherein the outside side walls of the assembly has similar threads 27 and fits inside the ring 28. Turning the ring will screw the ball assembly 23 up or down. The ball assembly 23 is prevented from turning around with the control ring 28 by a guiding pin 31 as shown in FIG. 7 passing through aperture 32 in a base of the assembly 23.

Another implementation is based on the ball assembly 34 riding up or down along one or more guides 35, 36 in the vertical direction. The guides are positioned in said channels 37 and 38 in widened portions 40, 41 (see FIG. 9). The guides 35, 36 may be guiding the assembly on the outside or inside (as shown) of the assembly. The position of the ball assembly along the guides may be controlled by several different methods. A simple screw system is shown in FIG. 10, or a wheel screwed on one of the guides as shown in FIG. 11, or an arm or lever which is pivoting around a fixed point as shown in FIG. 12.

More specifically, as shown in FIG. 10, the ball assembly is pre-loaded by a spring 48 encircling the guide pin 46 attached to a floor of the housing 42. This guide pin is received within a guide channel 49 in the ball assembly 45. Additionally, another guide pin 47 may be provided which is attached to a floor of the housing and is received in guide channel 50. The base of the housing 42 may have feet 43 and 44. A pocket 80 is provided having a screw thread aperture 52 which engages with threads of an adjustment screw 51, a head of which is received in the pocket 80. The top end of the screw 51 has a narrowed portion 54 received within an aperture 55 of the assembly 45. A head 53 is provided at an end of the narrow portion 54 for holding the assembly to the screw.

In FIG. 11 the ball assembly is also pre-loaded, in this case by a spring 63 received around a guide pin 57 within the assembly 65. An adjustment wheel 58 is provided on screw threads 59 on the guide pin 57. Both the guide pins 57 and 60 are attached to a floor of the housing 56. These guide pins are received in respective guide channels 61 and 62 of the assembly 65. The spring 63 has its one end abutting against a stop member 64 and its other bottom end abutting against an internal portion of the housing 65 as shown. By turning the adjustment wheel 58, the ball assembly height is adjustable.

In FIG. 12, the assembly is again pre-loaded by a spring 73 whose upper end abuts against a stop 74 and whose lower end abuts against an inside portion of the assembly 75. Again, guide pins 67 and 68 are provided on the housing 66 and are received in respective channels 71 and 72. A lever 69 pivoting about a pivot point 76 on a fulcrum 70 has its end 81 acting against a bottom surface 82 of the assembly 75. A means is provided for looking the lever in different positions between the top and the bottom position, such as locking nuts at 76 or other well known prior art techniques.

Figure 13A:
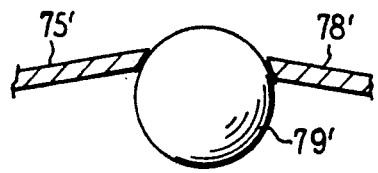
FIG. 13A shows a fragmentary cross sectional view of a removable cover having a relatively larger aperture size for a larger ball.
Figure 13B:
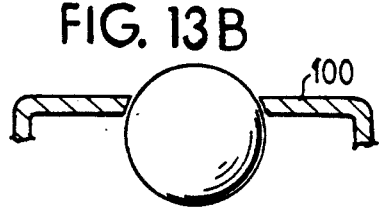
FIG. 13B shows a removable cover with a different contour.

The basic mouse housing must have an opening on the top which is large enough to allow the ball to move all the way to the top position. Therefore, when the ball is positioned below the highest point, an opening will exist between the ball and the trackball housing. To solve this problem, the invention, as shown in FIGS. 13A and 13B also includes special removable covers 75 or 75' which may be engaged at 77 by a snap-on mechanism not shown to the top of the trackball housing bottom portion 76. Each cover has a different sized opening 78 or 78' for the ball 79 or 79', so that it is possible to avoid a large opening between the ball 79 and the mouse housing 76, 75 (FIG. 13) or between the ball 79' and the housing 76, 75' (FIG. 13A).

It is also possible to have the snap-on top covers designed with different forms to better fit a specific operator's hand. The top covers 75 may be contoured differently such as shown at 100 in FIG. 13B, so that each operator may find a top which is optimized for his or her hand.

This invention will allow the operator to adjust the size of the ball area touching the operator's hand. Some people prefer a very large ball, some a small one. The snap-on covers will ensure that there is no excessive opening between the ball and the trackball housing. The covers may also offer different contour designs to be better optimized for a specific operator's hand.

Although various minor changes and modifications might be proposed by those skilled in the art, it will be understood that I wish to include within the claims of the patent warranted hereon all such changes and modifications as reasonably come within my contribution to the art.

I claim as my invention:

1. A trackball system, comprising:
   a housing having a top surface with an aperture therein;
   a ball assembly means for retaining a trackball roller ball with associated roll sensing means; and
   adjusting means including a single user adjustable control member for enabling a user to easily set with said single control member a vertical height of the ball assembly means relative to the housing such that a desired portion of the ball protrudes through the top surface aperture based on the vertical height setting.

2. A trackball system comprising:
   a housing having a top surface with an aperture therein;
   a ball assembly means for retaining a trackball roller ball with associated roll sensing means;
   adjusting means for setting a vertical height of the ball assembly means relative to the housing such that a desired portion of the ball protrudes through the top surface aperture based on the vertical height setting; and
   the adjusting means comprising the ball assembly means being circular and having a thread on an outer peripheral wall thereof, and turning means for engaging with the thread on the ball assembly means outer wall such that as the turning means is rotated, the vertical height of the ball assembly means is adjusted relative to the housing.

3. A system according to claim 2 wherein guide means is provided attached to the housing for preventing the ball assembly means from turning when the turning means is turned.

4. A system according to claim 2 wherein the housing has means for retaining the turning means in a given vertical position relative to a floor of the housing.

5. A system according to claim 2 wherein the turning means comprises a circular disc having an inner aperture with threads which engage with threads on the ball assembly means and whose outer portion is received in a retaining means of the housing.

6. A system according to claim 5 wherein the retaining means of the housing comprises a slot through which a portion of the disc protrudes.

7. A system according to claim 1 wherein the ball assembly means has at least one guide channel, and wherein a guide pin is provided projecting upwardly from a floor of the housing and is freely received in the guide channel without attachment to the guide channel.

8. A system according to claim 1 wherein spring means is provided for applying a spring force to the ball assembly means relative to the housing.

9. A system according to claim 1 wherein a screw means accessible and adjustable externally of the housing engages with both the ball assembly means and the housing such that as the screw is turned, a vertical height of the ball assembly means is changeable relative to the housing.

10. A system according to claim 9 wherein a spring means is introduced between a floor of the housing and a bottom of the ball assembly means for creating a spring force which pushes the ball assembly means away from a floor of the housing as the screw means is rotated.

11. A system according to claim 1 wherein a floor of the housing has first and second guide pins thereon, a spring encircles at least one of the two guide pins, the ball assembly means has respective guide channels for slidably receiving ends of the guide pins, and a screw means having one end engaging with the ball assembly means and the other end threadably engaging with the floor of the housing such that as the screw turns, the ball assembly means moves vertically, the vertical movement being assisted by the spring which is between a bottom of the ball assembly means and the housing floor.

12. A system according to claim 1 wherein the adjusting means comprises a guide pin which projects upwardly from a floor of the housing, and said single user adjustable control member comprises an adjustment member provided on the guide pin on which the ball assembly means rests.

13. A system according to claim 12 wherein a spring encircles an upper end of the guide pin, a top end of the spring abutting against a stop member and a bottom end of the spring abutting against an inner portion of the ball assembly means.

14. A system according to claim 1 wherein a lever means is provided for raising and lowering the ball assembly means relative to the housing.

15. A system according to claim 1 wherein the housing comprises a base portion and a removable cover mateable with the base portion, said cover having said aperture through which the ball projects, and wherein a diameter of the aperture is selected to accommodate the ball for a given height adjustment of the ball relative to the housing.

16. A system according to claim 1 wherein a plurality of removable covers are provided for the housing, each of which has a different aperture diameter corresponding to different ball adjustment heights.

17. A system according to claim 1 wherein a plurality of covers are provided for the housing, each having a different contour at a top portion thereof.

18. A system according to claim 1 wherein removable covers are provided for the housing, each being mateable with a base portion of the housing.

19. A trackball system, comprising:
a housing;
a trackball mounted in the housing with a portion of the ball protruding through an aperture in a surface of the housing; and
means for permitting a user to selectively adjust the ball relative to the housing surface by manipulating a control member externally of the housing such that more or less of the ball protrudes depending upon operator preference.

20. A system according to claim 19 wherein said control member comprises a control means accessible to the operator to permit the operator to adjust the ball protrusion from an extension of the housing.

* * * * *